(12) United States Patent
Stämmler et al.

(10) Patent No.: US 6,589,042 B2
(45) Date of Patent: Jul. 8, 2003

(54) APPARATUS FOR SHAPING THERMOPLASTICS MATERIALS

(75) Inventors: Gernold Stämmler, Bad Reichenhall (DE); Kurt Rosenmayer, Feldkirchen (DE); Reiner Huber, Freilassing (DE)

(73) Assignee: Paul Kiefel GmbH, Freilassing (DE)

( * ) Notice: Subject to any disclaimer, the term of this patent is extended or adjusted under 35 U.S.C. 154(b) by 63 days.

(21) Appl. No.: 09/795,837

(22) Filed: Feb. 28, 2001

(65) Prior Publication Data

US 2001/0033877 A1 Oct. 25, 2001

(30) Foreign Application Priority Data

Feb. 28, 2000 (DE) .......................................... 100 09 403

(51) Int. Cl.$^7$ ............................................... B29C 51/22
(52) U.S. Cl. .................... 425/387.1; 425/388; 425/402; 425/454
(58) Field of Search ................................ 425/383, 385, 425/453, 454, 409, DIG. 57, 503, 73–75, 387.1, 388; B29C 51/22

(56) References Cited

U.S. PATENT DOCUMENTS 4,724,113 A * 2/1988 Lee ........................... 264/276
4,764,241 A * 8/1988 Makino ....................... 425/388
5,453,000 A * 9/1995 Lebensfeld .................. 425/152
6,315,295 B1 * 11/2001 Sym ............................. 249/65

FOREIGN PATENT DOCUMENTS

DE          39 29 135      * 10/1990

* cited by examiner

*Primary Examiner*—Robert Davis
*Assistant Examiner*—Thu Khanh T. Nguyen
(74) *Attorney, Agent, or Firm*—Cohen, Pontani, Lieberman & Pavane

(57) ABSTRACT

An apparatus for shaping thermoplastic materials or for laminating backing parts includes a turntable driven by a rotary drive and having rests for receiving supporting devices for lower molds or backing parts. The turntable has a plurality of receiving places which can enter alternately into a preliminary blowing box, where a molded part can be shaped in conjunction with an upper mold arranged on an upper table. The preliminary blowing box has a front wall with an opening, facing the rotary drive. The turntable has a separating wall with flanges on both side which engage a wall indentation which surrounds the rotary drive and consequently bounds the preliminary blowing box, in order to seal the opening. A seal which can be shaped by means f a pressure medium and can be pressed against the separating wall is located in the front wall of the preliminary blowing box about the opening.

14 Claims, 5 Drawing Sheets

APPARATUS FOR SHAPING THERMOPLASTICS MATERIALS

BACK GROUND OF THE INVENTION

Field of the Invention

The invention relates to an apparatus for shaping thermoplastic materials or for laminating backing parts, comprising at least one locationally movable supporting device for a lower mould or a moulding receptacle and at least one locationally movable supporting device for an upper mould A preliminary blowing box which can be sealed off with respect to the atmosphere receives the supporting device with a lower mould or moulding receptacle during an operating procedure.

When moulding or laminating parts, in particular interior panelling parts for automobiles, two supporting devices for receiving a lower mould or a backing part are provided on a respective sliding table to achieve a rapid operating sequence, the sliding tables being able to enter alternately into a preliminary blowing box in a sealed form. In this case, the sliding tables are arranged at different heights, which inevitably leads to a certain limitation of the height of the moulded part or of the lower mould if the moulding station overall is to remain within reasonable outer dimensions. Furthermore, the sealable displaceability of the sliding tables at different heights is constructionally complex. A further major disadvantage exists when the upper mould is changed, since this mould has to be moved together with the necessary clamping framework downwards through the entire moulding station, which is laborious because of the confined space and great weight.

SUMMARY OF THE INVENTION

The object of the invention is to design an apparatus of the type explained at the beginning in such a way that, while the apparatus can be easily operated, short cycle times are possible and rapid mould changing is possible with a virtually unlimited height of the moulded part.

This object is achieved by providing a turntable for transporting the at least one supporting device, which turntable has for each supporting device a receiving place which is separated from the respectively neighbouring receiving place by a separating wall which closes an opening in the preliminary blowing box, apart from a small gap. When a supporting device is located underneath an upper mould in a working station provided in the preliminary blowing box, the small gap between the separating wall and the wall of the preliminary blowing box can be sealed off by a seal.

A major advantage of this design according to the invention is that, after a mould or a backing part has entered the preliminary blowing box, the latter is sealed by the separating wall and the associated seal in a very short time after the mould or backing part has reached the working position the preliminary blowing box, is therefore ready for use, and the receiving place remaining outside the preliminary blowing box can be immediately loaded with a new backing part. In comparison with an apparatus with a sliding table, this has the advantage that, with the same cycle time, that time which remains for loading the backing part is significantly longer since with the arrangement of sliding tables it is necessary to bring corresponding closing flaps into the closed position in order to seal off the preliminary blowing box. During this time, for safety reasons the operator cannot reach the receiving space to be newly loaded.

Another advantage is that all the receiving places remain at the same height, to be specific in the plane of the turntable, whereas in the case of an apparatus with multilevel sliding tables the working height changes in each case. Furthermore, there is virtually no restriction with regard to the height of the moulded part, which is the case in the design with sliding tables, since there the distance between the two sliding tables cannot be chosen to be of any desired size, which inevitably leads to a restriction on the height of the moulded part. The main element of the invention in this respect is the arrangement of a separating wall in connection with a seal, which separates a receiving place from neighbouring receiving places, the separating wall closing the through-opening for a lower mould or a backing part in the preliminary blowing box, so that both a negative pressure and a positive pressure can be built up in the preliminary blowing box according to the intended mode of operation. The expression supporting device is intended to mean, for example, a base plate for a mould or a backing part.

The seal is preferably arranged on the fixed wall of the preliminary blowing box and is able to be pressed against the separating wall.

The seal may, however, also be arranged on the separating wall and be able to be pressed against the fixed wall of the preliminary blowing box.

A particularly preferred design of the invention consists in that the seal is preferably formed as a flexible seal and is arranged in a groove of the wall of the preliminary blowing box along the rim of the opening and can be pressed against the separating wall by a pressure medium. The arrangement of the seal in the fixed wall of the preliminary blowing box has the advantage of the fixed arrangement of feed lines for the pressure medium to allow the seal to be pressed against the separating wall. If the seal is of a sufficiently flexible design, it retracts into the initial state of its own accord on account of the elasticity, so that the seal is not subjected to any frictional effect during the rotation of the turntable.

To intensify the effect of the retraction of the seal for the rotating operation of the turntable, it may be advantageous if the seal is subjected to a restoring force after the pressure medium is switched off. This can be produced for example by subjecting the seal to negative pressure. For example, the base of the groove in which a flexible seal is guided can be connected to a negative pressure source, whereby the seal is retracted into the groove and comes free from the separating wall more intensely and more quickly, whereby it is does not hinder the rotating operation and is also not subjected to any wear caused by the rotation of the turntable. The rapid retraction of the seal allows the rotating operation to commence earlier, which brings about a shorter cycle time.

A particularly simple design is obtained if the seal is formed as a tubular seal and the interior of the tube is able to be connected to a pressure source and/or a negative pressure source.

A constructionally simple design of the turntable and its sealing is obtained in an advantageous way by the turntable having on the underside a rotary bearing and a rotary drive, by the wall of the preliminary blowing box facing the rotary bearing being formed around the rotary bearing and the rotary drive with an indentation and by the separating wall having in the region of the indentation on both its sides a flange which covers this indentation and interacts with the seal arranged on the wall of the preliminary blowing box. This makes it possible to arrange an uninterrupted, continuous seal in the wall of the preliminary blowing box, which is not only constructionally simpler but also operationally more reliable.

To be able to change a mould, whether in the case of the turntable or in the case of the upper table, in a simple way, the turntable has at each receiving place two rests, which serve for receiving a supporting device for a lower mould or a backing part and can be transferred from a holding position for the supporting device into a letting-through position, in which a mould can be changed by lowering of the supporting device. With the aid of an additional lifting table, not only the lower mould but also subsequently the upper mould, lowered onto the rests, can be fetched in the working position of the turntable in the working station, and consequently a complete mould change can be carried out together with a clamping framework change.

Above the turntable, any arrangements of the upper moulds may be provided. For example, an upper mould may be arranged on an upper lifting table arranged above the turntable. This concerns the arrangement of a single upper mould, which interacts for example alternately with two lower moulds arranged on the turntable.

When a plurality of upper moulds are used, they may be respectively assigned to a sliding table which is vertically movable.

An advantageous combination with the design of the turntable and its possibilities for the arrangement of various lower moulds consists in that upper moulds are arranged on a mould receptacle which is mounted to be rotated and driven. In this case, the mould receptacle may be vertically movable.

DETAILED DESCRIPTION OF THE PRESENTLY PREFERRED EMBODIMENTS

Figure 1:
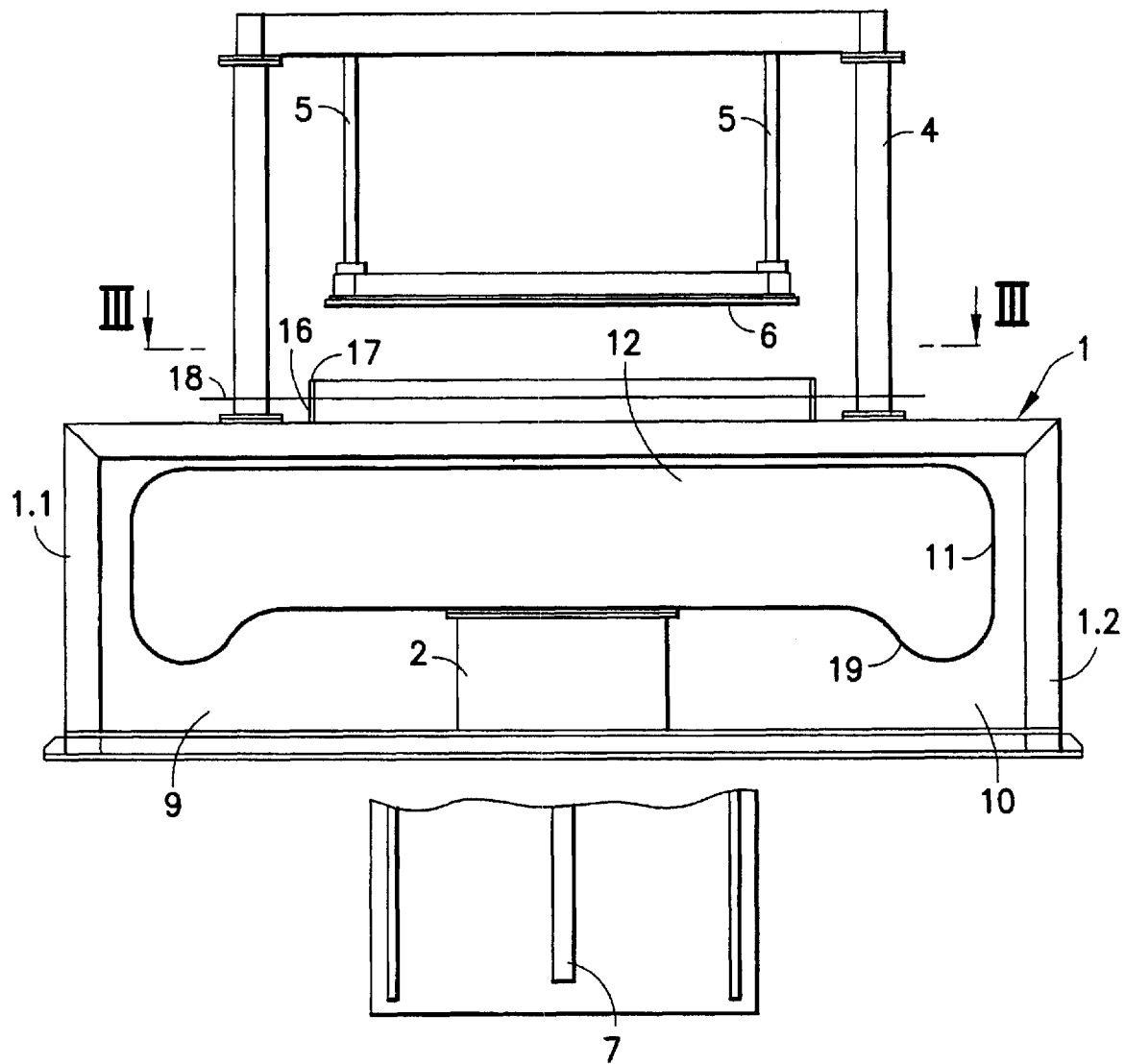
FIG. 1 shows a front view of an apparatus for shaping thermoplastic materials or laminating backing parts.
Figure 2:
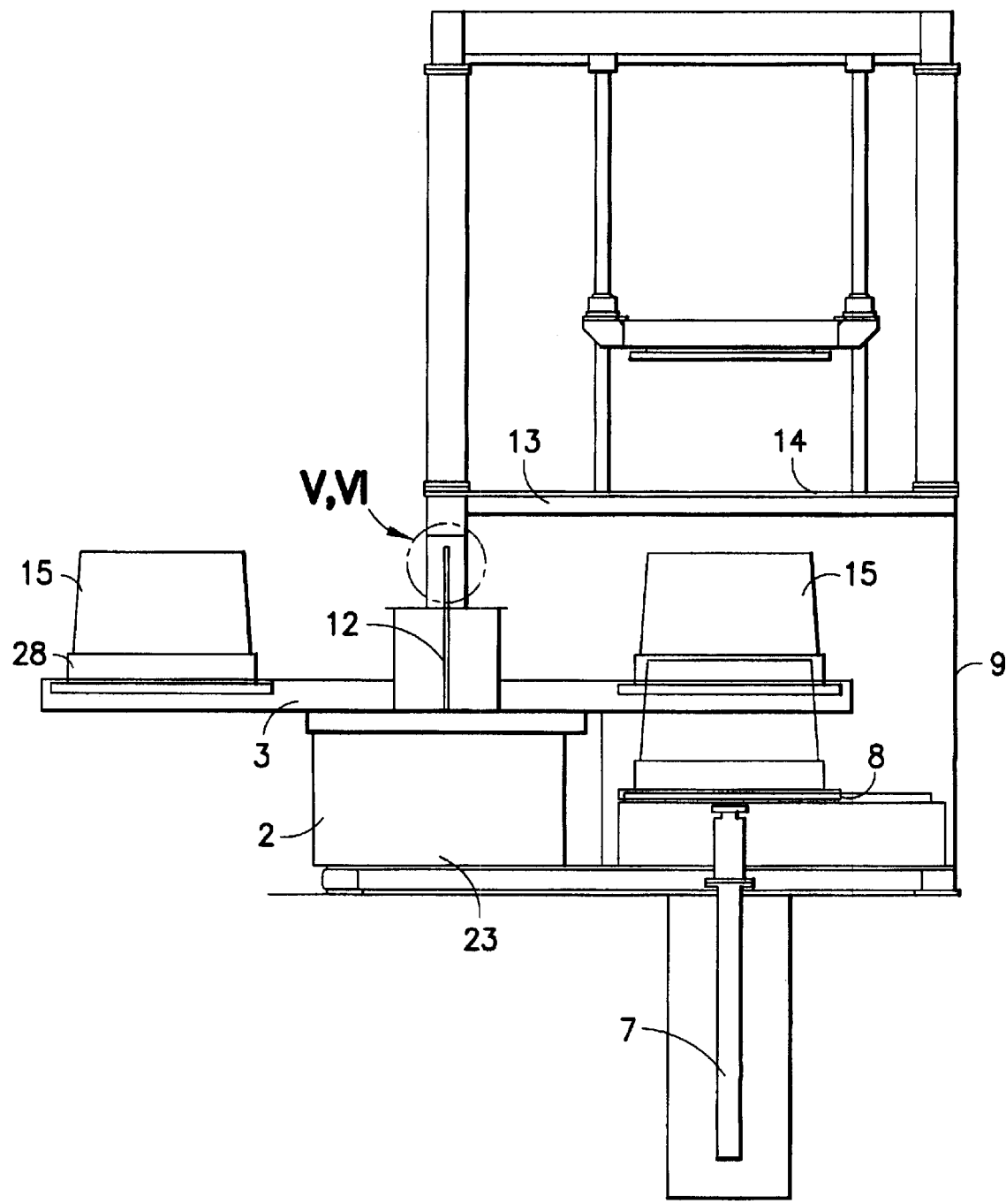
FIG. 2 shows a side view of the apparatus according to FIG. 1.

The apparatus for shaping thermoplastic materials or for laminating backing parts either with thermoplastic materials or else with other materials, for example covered woven fabrics, has a base framework 1, within which a rotary drive 2 for a turntable 3 is arranged. Arranged on the base framework 1 is an upper framework 4, which holds an upper table 6 displaceably in the vertical direction on corresponding guides 5.

Figure 3:
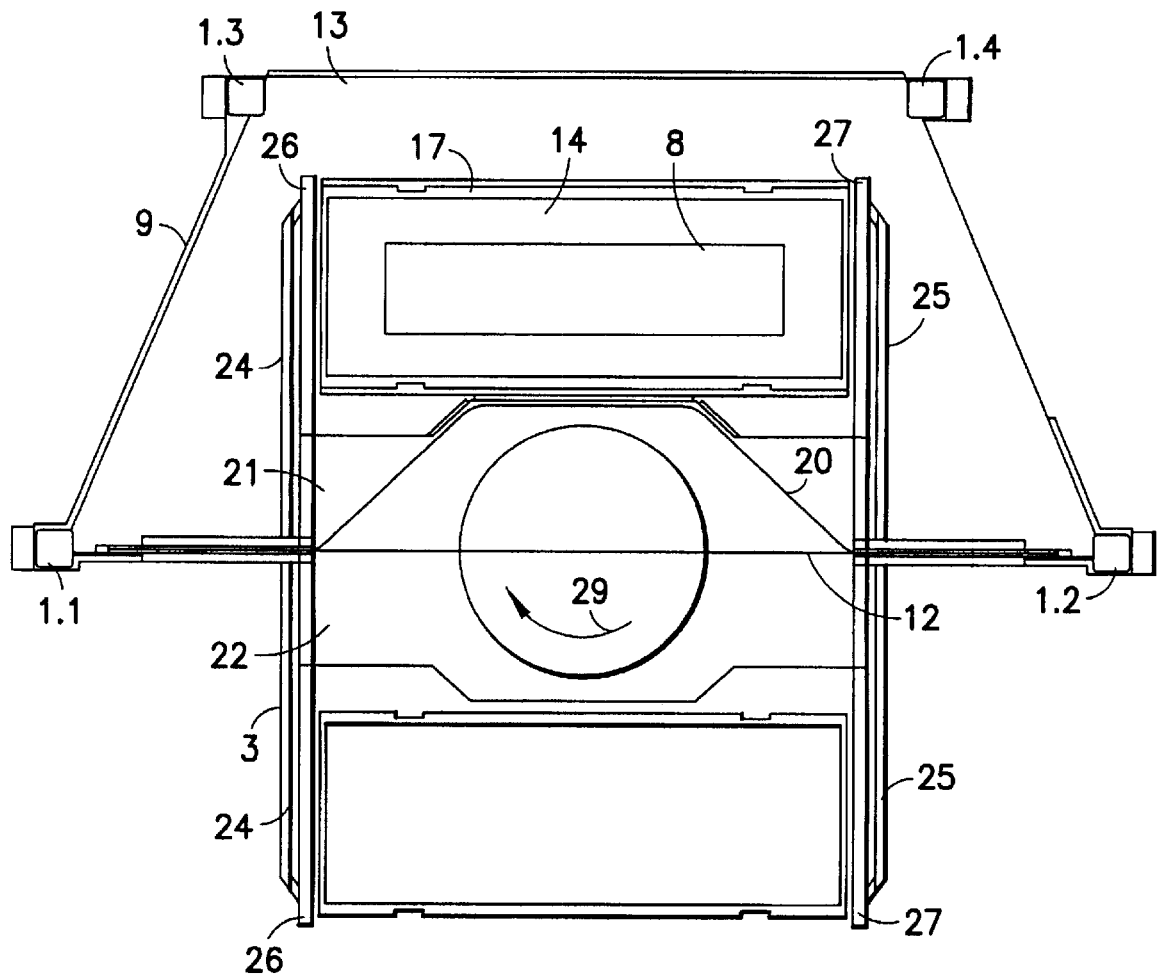
FIG. 3 shows a section along the line III—III in FIG. 1.
Figures 5, 6:
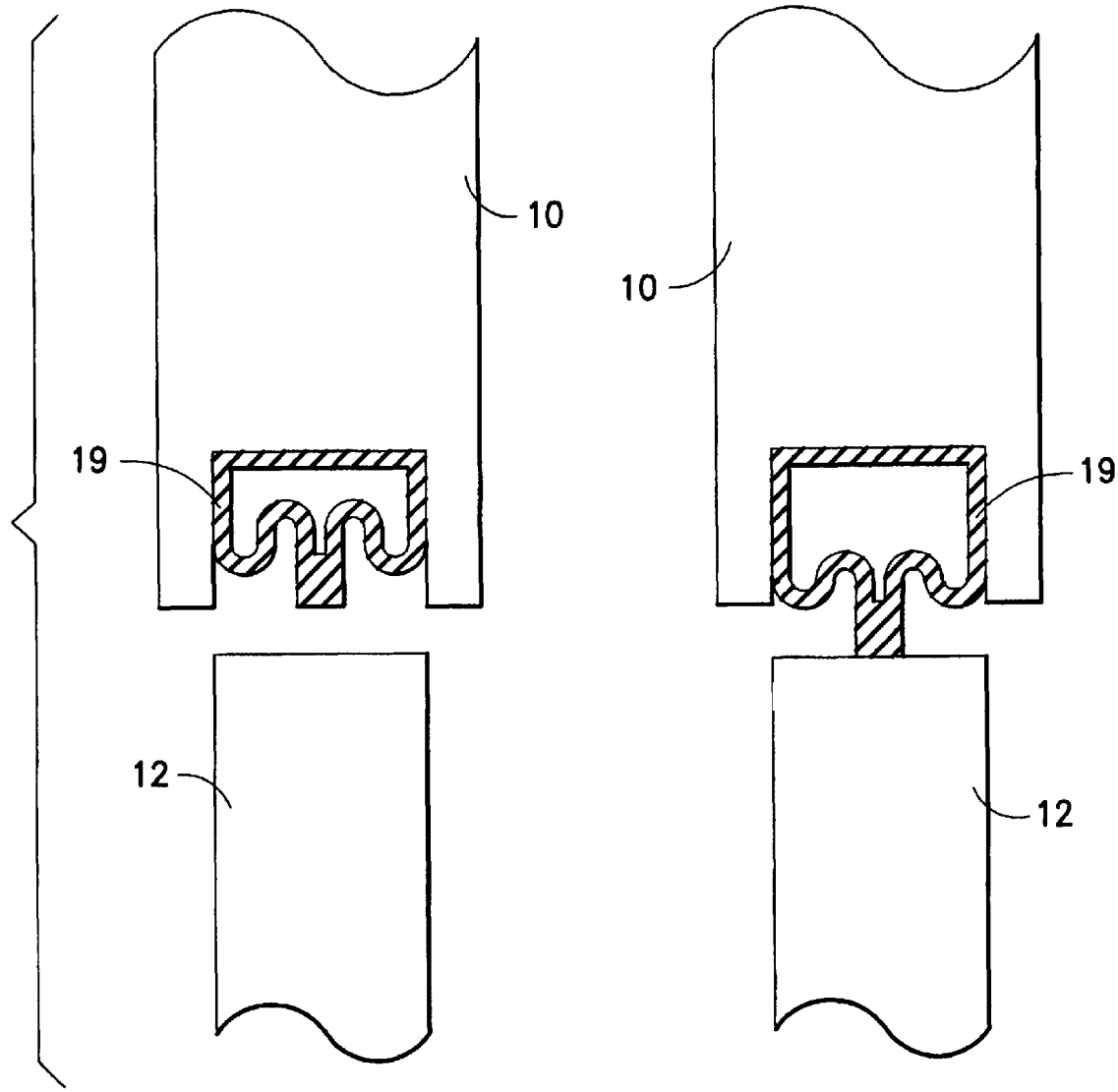
FIG. 5 is an enlarged detail of area V;VI in FIG. 2, showing the seal in the uninflated state.
FIG. 6 is an enlarged detail showing the seal in the inflated state.

Provided underneath the standing plane of the base framework 1, that is within the floor under the apparatus, is a lifting apparatus 7 for a lower lifting table 8. Formed within the base framework 1, which has four corner posts 1.1 to 1.4, is a preliminary blowing box 9, which has in its front wall 10 an opening 11 which extends virtually over the entire front wall 10 between the corner posts 1.1 and 1.2 and can be closed by a separating wall 12, which is fixedly arranged on the turntable 3 and is able to rotate together with the latter. Arranged above the preliminary blowing box 9, i.e. above its top 13, which is provided with an opening 14 for the passing through of the lower mould or a backing part 15, are a lower clamping framework 16 and an upper clamping framework 17, which clamp between them a film 18 indicated by a dash-dotted line, so that the preliminary blowing box 9 is sealed off upwards on the one hand by its top 13 and on the other hand by the film 18 in the region of the opening 14. In order that the preliminary blowing box 9 can be closed in an airtight manner in the region of the opening 11, which is essentially closed by the separating wall 12, a seal 19 is provided on the front wall 10 around the periphery of opening 11. Since, at the centre of the turntable 3, the rotary drive 2 is provided at the center of the turn table 3, the front wall 10 has an indentation 20, which is indicated in FIG. 3 by a dashed-dotted line. This indentation surrounds the rotary drive, so that the latter lies outside the preliminary blowing box. The seal 19 follows this indentation, so that the opening 11 is completely provided with a seal which is located in a groove within the front wall 10 and is able to be pressed out of this groove and against the separating wall 12 by means of a pressure medium as shown in FIG. 6. This seal is formed as a tubular seal and is connected to a pressure source. To be able to release the seal again, in order that the separating wall 12 does not rub against the seal during the rotation of the turntable, this tubular seal is also able to be connected to a negative pressure source, so that it can be retracted again from its sealing position very quickly see FIG. 5. In this retracted position, the turntable can be turned together with the separating wall, without the seal being damaged in the process. In order to seal the opening 11 in spite of the indentation 20, arranged on the lower edge of the separating wall 12, protruding to each side, there is a flange 21 and 22, which completely covers the indentation 20, as can be seen from FIG. 3, so that the the seal 19 provided in this region presses from below against the respective flange, which is located in the region of this indentation of the front wall of the preliminary blowing box.

The turntable 3 has on both sides of the axis of symmetry, 23 passes through the centre of rotation, in each case to parallel rails 24 and 25, which are equipped with pivotable rests 26 and 27. In the holding position of the rests 26 and 27, represented in FIG. 3, these rests serve for receiving a supporting device 28, i.e. a base plate, for a backing part 15 or a lower mould, which is not represented in the drawing. In a swung-up position (not represented in the drawing), the rests 26 and 27 make it possible for the supporting device 28 to be received, in order to allow the latter to be lowered downwards together with a mould and clamping framework when the corresponding receiving place of the turntable 3 is located in the preliminary blowing box 9, in order in this way to be able to carry out a mould change.

The mode of operation of the apparatus is explained below. The lower mould, or backing past is to be laminated, located on a supporting device 28, once it has been deposited on the turntable 3, enters the preliminary blowing box 9 by turning of the turntable in the direction of the arrow 29 and is brought into the working position located within the preliminary blowing box underneath the upper table 6. In the meantime, the film 18 has been brought between the lower clamping framework 16 and the upper clamping framework 17 by means of pin chains (not represented), whereby the preliminary blowing box 9 is sealed off upwards in the region of the opening 14 after the clamping frameworks have been moved together.

The sealing at the front wall 10 is performed by the separating wall 12, the flange 21 or 22 and the peripheral seal 19, which in the inflated state presses against the separating wall and consequently seals off the preliminary blowing box in the region of the opening 11. After this, depending on the mode of operation, either compressed air is blown into the preliminary blowing box or the preliminary blowing box is subjected to a slight vacuum. The film 18 is either made to billow upwards in the direction of the upper table 6 or is sucked downwards into the preliminary blowing box. Then, with the aid of a lower table 8, the supporting device 28 with the lower mould or a backing part 15 is pressed upwards against the film 18 and the film in this state is sucked against the backing part 15 or corresponding lower mould by means of negative pressure connected to the supporting device, and is thereby shaped. An upper mould formed in a way corresponding to the lower mould or the backing part 15 may be provided on the upper table 6 or moulding aids which the film against the lower mould or the backing part 15 at particularly critical points may be provided. For this purpose, the upper table 6 can be moved in height. After this moulding operation, the finished moulded part is punched out from the film 18 with the aid of a punching tool, which is likewise arranged on the upper table 6, and the lower mould is deposited by means of the lower table 8 on the turntable 3. After this, the turntable is turned again, so that the finished moulded part can be removed on the operator side, which is located outside the preliminary blowing box 9. After this, a new backing part can again be laid in place.

Figure 4:
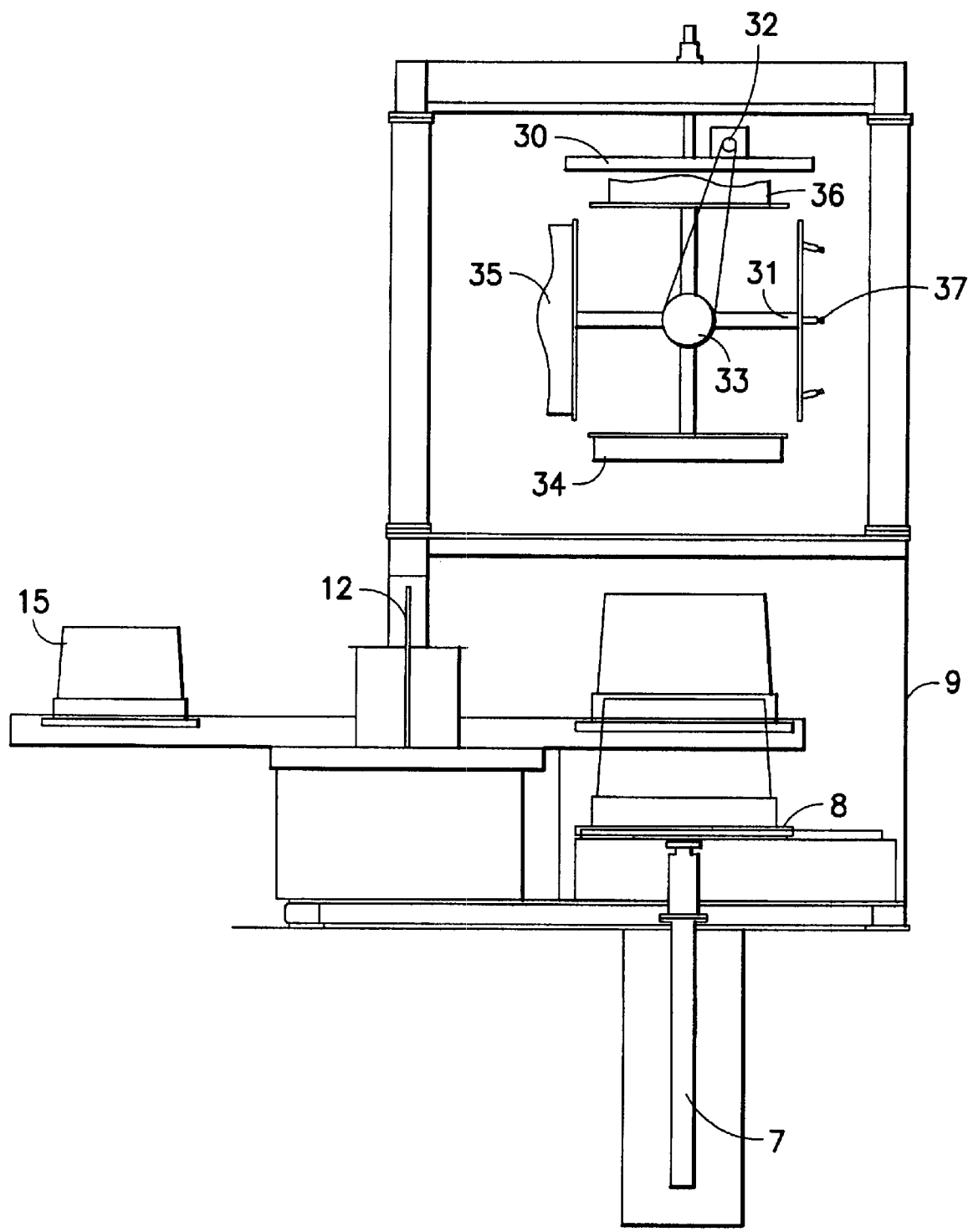
FIG. 4 shows a side view corresponding to FIG. 2 of an apparatus of a modified design.

FIG. 4 shows a modified embodiment, the modification consisting in that a holding device for a rotary cross 31, or a rotatable tool-receiving device, for example in the form of a square frame, is provided and can be driven about an axis 33 by means of a drive 32. The rotary cross has four arms, at the ends of which different tools 34 to 37 are arranged. These different tools are respectively a moulding-assisting tool, for example a preliminary blowing shell or preliminary sucking shell, a punching tool or a fixed or driven moulding aid, which, depending on requirements, is brought into engagement with the moulded part to be produced, which is located on the lower mould or backing part.

Such a multiple arrangement of tools on a rotary cross is described in DE 39 29 135 C1.

What is claimed is:

1. An apparatus for shaping thermoplastic materials or for laminating backing parts, said apparatus comprising
    a preliminary blowing box comprising a fixed wall having an opening therein,
    a working station in said blowing box,
    a supporting device for an upper mold in said preliminary blowing box above said working station,
    a turntable having a plurality of receiving places, each receiving place receiving a supporting device for a lower mold, each receiving place being separated from an adjacent said receiving place by a separating wall, said turntable being rotatable so that said separating wall closes said opening but for a small gap when one of said receiving stations is positioned so that a supporting device thereon is located below an upper mold at said working station, and
    a seal which can seal off said gap when said supporting device for a lower mold is located underneath said upper mold at said working station.

2. A apparatus according to claim 1, wherein the seal is arranged on the fixed wall of the preliminary blowing box and can be pressed against the separating wall.

3. An apparatus according to claim 1, wherein the seal is arranged on the separating wall and can be pressed against the fixed wall of the preliminary blowing box.

4. A apparatus according to claim 1, wherein the fixed wall of the preliminary blowing box has a groove around the opening, and the seal is formed as a fixed seal arranged in the groove and can be pressed against the separating wall by a pressure medium.

5. An apparatus according to claim 4, wherein the seal is retractable after the pressure medium is switched off.

6. An apparatus according to claim 4, wherein the seal is retractable under negative pressure.

7. An apparatus according to claim 1, wherein the seal is formed as a tubular seal which can be connected to at least one of a pressure source and a negative pressure source.

8. An apparatus according to claim 2, further comprising a rotary bearing and a rotary drive under the turntable the fixed wall of the preliminary blowing box being formed around the rotary bearing and the rotary drive with an indentation, said turntable having a flange on each side of said supporting wall each flange cooperating with said indentation to form a gap which is sealable by the seal arranged on the fixed wall.

9. An apparatus according to claim 1, wherein the turntable has at each receiving place two rests, which serve for receiving a supporting device for a lower mould or a backing part, which rests can be transferred from a holding position for the supporting device into a letting-through position, in which a lower mold can be changed by lowering the supporting device for the lower mold.

10. An apparatus according to claim 1, wherein said supporting device for an upper mold comprises a lifting table arranged above the turntable.

11. An apparatus according to claim 1, said supporting device for an upper mold comprises a sliding table which is vertically movable, whereby a plurality of upper mold can be used.

12. An apparatus according to claim 1, wherein said supporting device for an upper mold comprises a mold receptacle which is mounted so that it can be rotated and driven.

13. An apparatus according to claim 12, wherein the mold receptacle is vertically movable.

14. An apparatus according to claim 1, wherein said turntable has two receiving places with an axis of symmetry therebetween, said separating wall passing through said axis of symmetry.

* * * * *